United States Patent
Yu et al.

(10) Patent No.: US 10,251,071 B2
(45) Date of Patent: Apr. 2, 2019

(54) INCREMENTAL SCHEDULING FOR WIRELESS COMMUNICATION SYSTEM WITH BEAMFORMING

(71) Applicant: MEDIATEK INC., Hsinchu (TW)

(72) Inventors: Chia-Hao Yu, Yilan County (TW); Ming-Po Chang, New Taipei (TW); Aimin Justin Sang, San Diego, CA (US); Jiann-Ching Guey, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 8 days.

(21) Appl. No.: 14/859,668

(22) Filed: Sep. 21, 2015

(65) Prior Publication Data

US 2016/0095003 A1 Mar. 31, 2016

Related U.S. Application Data

(60) Provisional application No. 62/055,690, filed on Sep. 26, 2014.

(51) Int. Cl.
*H04W 16/28* (2009.01)
*H04W 52/02* (2009.01)
(Continued)

(52) U.S. Cl.
CPC .......... *H04W 16/28* (2013.01); *H04B 7/0695* (2013.01); *H04L 5/0094* (2013.01);
(Continued)

(58) Field of Classification Search
None
See application file for complete search history.

(56) References Cited

U.S. PATENT DOCUMENTS

| 20,093,136 | 4/2012 | Julian et al. .................. 370/336 |
| 30,286,960 | 10/2013 | Li et al. ......................... 370/329 |

(Continued)

FOREIGN PATENT DOCUMENTS

| CN | 101877608 A | 6/2010 |
| CN | 103220076 A | 1/2012 |

(Continued)

OTHER PUBLICATIONS

USPTO, Office Action for related U.S. Appl. No. 14/854,344 dated Jul. 1, 2016 (9 pages).

(Continued)

*Primary Examiner* — Alex Skripnikov
(74) *Attorney, Agent, or Firm* — Imperium Patent Works; Zheng Jin

(57) ABSTRACT

An incremental scheduling scheme is proposed in a wireless communication system with beamforming. In an initial stage (stage-1), coarse scheduling plan is granted via control beam transmission. In a second stage (stage-2), fine scheduling plan is granted via dedicated beam transmission. Such incremental scheduling scheme provides load balancing for overhead channels on control/dedicated beams via stage-2 scheduling. It utilizes dedicated beam transmission that is more resource efficient and more UE-specific. Furthermore, it provides UE natural power-saving opportunities via stage-1 scheduling.

17 Claims, 8 Drawing Sheets

INCREMENTAL SCHEDULING

(51) Int. Cl.
*H04W 72/04* (2009.01)
*H04W 72/12* (2009.01)
*H04B 7/06* (2006.01)
*H04L 5/00* (2006.01)
*H04W 28/08* (2009.01)
*H04B 7/0408* (2017.01)

(52) U.S. Cl.
CPC ..... *H04W 52/0209* (2013.01); *H04W 72/046* (2013.01); *H04W 72/0446* (2013.01); *H04W 72/12* (2013.01); *H04B 7/0408* (2013.01); *H04W 28/08* (2013.01); *Y02D 70/1262* (2018.01); *Y02D 70/24* (2018.01)

(56) References Cited

U.S. PATENT DOCUMENTS

| | | | |
|---|---|---|---|
| 2008/0008110 A1 | 1/2008 | Kishigami et al. | 370/310 |
| 2012/0093136 A1 | 4/2012 | Julian et al. | 370/336 |
| 2012/0213137 A1* | 8/2012 | Jeong | H04W 52/0212 370/311 |
| 2013/0235807 A1 | 9/2013 | Lee et al. | 370/329 |
| 2013/0286960 A1 | 10/2013 | Li et al. | 370/329 |
| 2013/0295852 A1 | 11/2013 | Kim et al. | 455/63.4 |
| 2014/0211731 A1 | 7/2014 | Inoue et al. | 370/329 |
| 2015/0092676 A1 | 4/2015 | Periyalwar et al. | 370/329 |
| 2016/0192433 A1* | 6/2016 | Deenoo | H04W 72/046 370/329 |
| 2017/0034812 A1* | 2/2017 | Deng | H04W 72/046 |

FOREIGN PATENT DOCUMENTS

| | | |
|---|---|---|
| EP | 2747304 A1 | 6/2014 |
| WO | WO2013134128 A1 | 3/2012 |

OTHER PUBLICATIONS

International Search Report and Written Opinion of International Search Authority for PCT/CN2015/089706 dated Dec. 21, 2015 (11 pages).

International Search Report and Written Opinion of International Search Authority for PCT/CN2015/090773 dated Dec. 31, 2015 (11 pages).

EPO, search report for the related EP patent application 15843674.1 dated Jan. 17, 2018 (8 pages).

SIPO, search report for the CN patent application 201580002503.5 (no English translation is available) dated Dec. 5, 2018 (6 pages).

\* cited by examiner

INCREMENTAL SCHEDULING

INCREMENTAL SCHEDULING FOR WIRELESS COMMUNICATION SYSTEM WITH BEAMFORMING

CROSS REFERENCE TO RELATED APPLICATIONS

This application claims priority under 35 U.S.C. § 119 from U.S. Provisional Application No. 62/055,690, entitled "Incremental Scheduling for Wireless Communication System with Beamforming," filed on Sep. 26, 2014; the subject matter of which is incorporated herein by reference.

TECHNICAL FIELD

The disclosed embodiments relate generally to wireless communication, and, more particularly, to incremental scheduling in a Millimeter Wave (mmW) beamforming system.

BACKGROUND

The bandwidth shortage increasingly experienced by mobile carriers has motivated the exploration of the underutilized Millimeter Wave (mmWave) frequency spectrum between 3G and 300G Hz for the next generation broadband cellular communication networks. The available spectrum of mmWave band is two hundred times greater than the conventional cellular system. The mmWave wireless network uses directional communications with narrow beams and can support multi-gigabit data rate. The underutilized bandwidth of the mmWave spectrum has wavelengths ranging from 1 mm to 100 mm. The very small wavelengths of the mmWave spectrum enable large number of miniaturized antennas to be placed in a small area. Such miniaturized antenna system can produce high beamforming gains through electrically steerable arrays generating directional transmissions.

With recent advances in mmWave semiconductor circuitry, mmWave wireless system has become a promising solution for real implementation. However, the heavy reliance on directional transmissions and the vulnerability of the propagation environment present particular challenges for the mmWave network. In general, a cellular network system is designed to achieve the following goals: 1) Serve many users with widely dynamical operation conditions simultaneously; 2) Robust to the dynamics in channel variation, traffic loading and different QoS requirement; and 3) Efficient utilization of resources such as bandwidth and power. Beamforming adds to the difficulty in achieving these goals.

Analog beamforming is a good candidate for application in mmWave beamforming wireless systems. It provides array gain for compensating severe pathloss due to harsh wireless propagation environment, and removes the need for training channel response matrix between multiple antenna elements at TX/RX sides. To provide moderate array gain, large number of array elements may be needed. Different beamformers can have different spatial resolution, i.e., beamwidth. For example, a sector antenna can have shorter but wider spatial coverage, while a beamforming antenna can have longer but narrower spatial coverage. At a base station (BS) side, a sector/cell is served by a manageable number of coarse control beams. All control beams in a cell is referred to as control region. Other finer-resolution BS beams are termed dedicated beams that need to be trained before usage. All dedicated beams in a cell is referred to as dedicated region. Beam training mechanism ensures that BS beam and UE beam are aligned for data communication.

Control region is more crowded than dedicated region. Control beams carry more overhead channels, e.g., to broadcast information. Control beams have wider angular coverage than dedicated beams, thus more UE to serve. On the other hand, dedicated beam transmission is more resource-efficient. Dedicated beam has higher array gain and has less crowded control channel. The resource ratio of overhead channel to data channel for a UE in dedicated beam is lower than that of control beam. Dedicated beam transmission is possible only in dedicated resources. Moreover, DRX is essential for UE power consumption perspective. However, user traffic could be very bursty so that DRX mechanism in existing technologies cannot be applied directly in mmWave systems.

A solution for properly utilizing and balancing different beams with power saving mechanism in mmWave beamforming systems is sought.

SUMMARY

An incremental scheduling scheme is proposed in a wireless communication system with beamforming. In an initial stage (stage-1), coarse scheduling plan is granted via control beam transmission. In a second stage (stage-2), fine scheduling plan is granted via dedicated beam transmission. Such incremental scheduling scheme provides load balancing for overhead channels on control/dedicated beams via stage-2 scheduling. It utilizes dedicated beam transmission that is more resource efficient and more UE-specific. Furthermore, it provides UE natural power-saving opportunities via stage-1 scheduling.

In one embodiment, a base station allocates a set of control resource blocks in a beamforming mobile communication network. The set of control resource blocks are associated with a set of control beams. The base station allocates a set of dedicated resource blocks associated with a set of dedicated data beams. The control resource blocks and the dedicated resource blocks are time division multiplexed in time domain. The base station then provides coarse scheduling information to a UE via control beam transmission. Finally, the base station provides fine scheduling information to the UE via dedicated data beam transmission.

In another embodiment, a UE establishes data communication with a base station over one or more control beams associated with a set of control resource blocks in a beamforming mobile communication network. The UE establishes data communication with the base station over one or more dedicated data beams associated with a set of dedicated resource blocks. The control resource blocks and the dedicated resource blocks are time division multiplexed in time domain. The UE then receives coarse scheduling information from the base station via control beam transmission. Finally, the UE receives fine scheduling information from the base station via dedicated data beam transmission.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
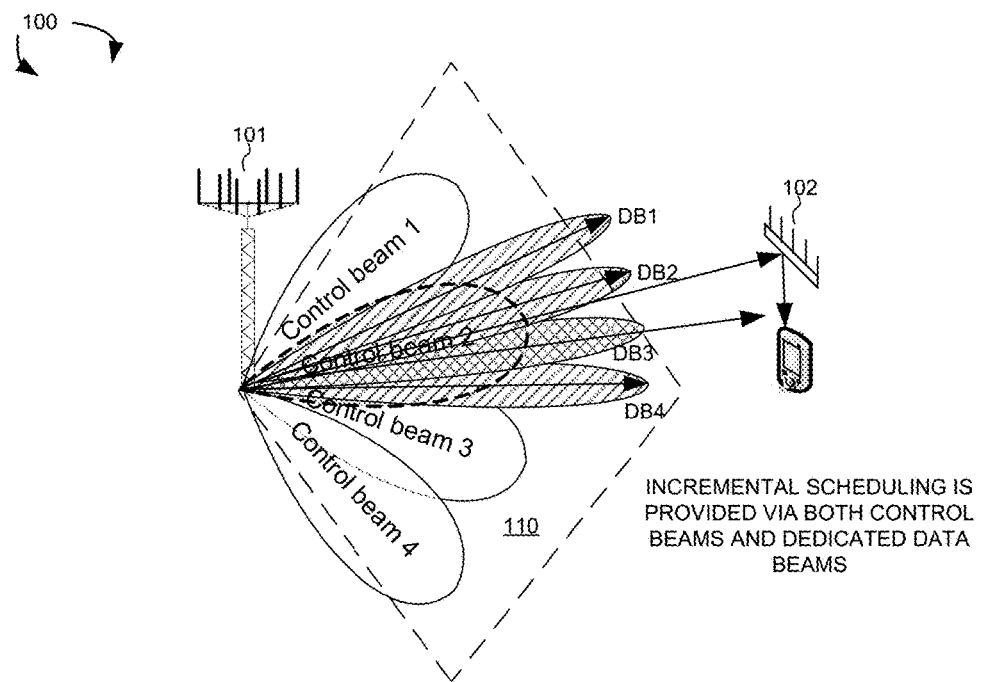
FIG. 1 illustrates control beams and dedicated beams in a beamforming wireless communication system in accordance with one novel aspect.

FIG. 1 illustrates control beams and dedicated beams in a beamforming Millimeter Wave (mmWave) cellular network 100 in accordance with one novel aspect. Beamforming mmWave mobile communication network 100 comprises a base station eNB 101 and a user equipment UE 102. The mmWave cellular network uses directional communications with narrow beams and can support multi-gigabit data rate. Directional communications are achieved via digital and/or analog beamforming, wherein multiple antenna elements are applied with multiple sets of beamforming weights to form multiple beams. In the example of FIG. 1, BS 101 is directionally configured with multiple cells, and each cell is covered by a set of coarse TX/RX control beams. For example, cell 110 is covered by a set of four control beams CB1, CB2, CB3, and CB4. The collection of the control beams CB1-CB4 covers an entire service area of cell 110, and each control beam has a wider and smaller array gain as depicted. Each control beam in turn is covered by a set of dedicated data beams. For example, CB2 is covered by a set of four dedicated data beams DB1, DB2, DB3, and DB4. The collection of the dedicated data beams covers a service area of one control beam, and each dedicated data beam has a narrower and higher array gain as depicted.

The set of control beams are lower-level beams that provide low rate control signaling to facilitate high rate data communication on higher-level data beams. The set of control beams may be periodically configured or occur indefinitely and repeatedly in order known to the UEs. The set of control beams covers the entire cell coverage area with moderate beamforming gain. Each control beam broadcasts minimum amount of cell-specific and beam-specific information similar to System Information Block (SIB) or Master Information Block (MIB) in LTE systems. Each beam may also carry UE-specific control or data traffic. Each beam transmits a set of known signals for the purpose of initial time-frequency synchronization, identification of the control beam that transmits the signals, and measurement of radio channel quality for the beam that transmits the signals.

The control beam and dedicated data beam architecture provides a robust control-signaling scheme to facilitate the beamforming operation in mmWave cellular network systems. Furthermore, different spatial paths offered by different levels of control beams and dedicated data beams, result in different channel coherent time and fading dynamics. Multiple choices of spatial beams thus offer more spatial diversity to be explored in mmWave small cells. In according with one novel aspect, an incremental downlink-scheduling scheme is proposed. In an initial stage (stage-1), coarse scheduling plan is granted via control beam transmission. In a second stage (stage-2), fine scheduling plan is granted via dedicated beam transmission. Such incremental scheduling scheme provides load balancing for overhead channels on control/dedicated beams via stage-2 scheduling. It utilizes dedicated beam transmission that is more resource efficient and more UE-specific. Furthermore, it provides natural application of DRX behavior via stage-1 scheduling.

Figure 2:
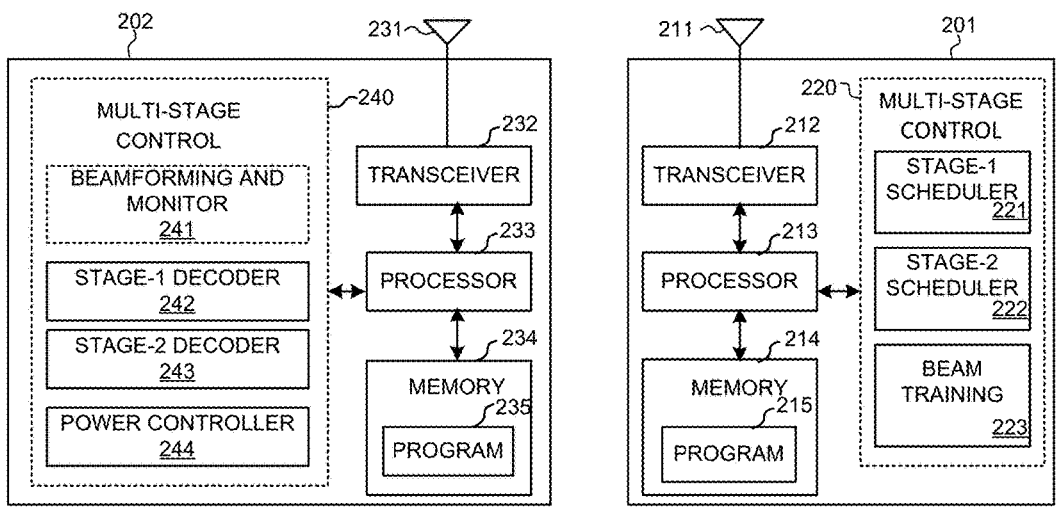
FIG. 2 is a simplified block diagram of a base station and a user equipment that carry out certain embodiments of the present invention.

FIG. 2 is a simplified block diagram of a base station and a user equipment that carry out certain embodiments of the present invention. BS 201 has an antenna array 211 having multiple antenna elements that transmits and receives radio signals, one or more RF transceiver modules 212, coupled with the antenna array, receives RF signals from antenna 211, converts them to baseband signal, and sends them to processor 213. RF transceiver 212 also converts received baseband signals from processor 213, converts them to RF signals, and sends out to antenna 211. Processor 213 processes the received baseband signals and invokes different functional modules to perform features in BS 201. Memory 214 stores program instructions and data 215 to control the operations of BS 201. BS 201 also includes multiple function modules that carry out different tasks in accordance with embodiments of the current invention.

Similarly, UE 202 has an antenna 231, which transmits and receives radio signals. A RF transceiver module 232, coupled with the antenna, receives RF signals from antenna 231, converts them to baseband signals and sends them to processor 233. RF transceiver 232 also converts received baseband signals from processor 233, converts them to RF signals, and sends out to antenna 231. Processor 233 processes the received baseband signals and invokes different functional modules to perform features in UE 202. Memory 234 stores program instructions and data 235 to control the operations of UE 202. UE 202 also includes multiple function modules and circuits that carry out different tasks in accordance with embodiments of the current invention.

The functional modules are circuits that can be implemented and configured by hardware, firmware, software, and any combination thereof. For example, BS 201 comprises a multi-stage controller/scheduler 220, which further comprises a stage-1 scheduler 221, a stage-2 scheduler 222, and a beam-training module 223. Beam-training module 223 may belong to part of the RF chain, which applies various beamforming weights to multiple antenna elements of antenna 211 and thereby forming various beams. Beam-training module also performs initial beam alignment and subsequent beam tracking for BS 201. Stage-1 scheduler 221 provides coarse scheduling information over control beams. Stage-2 scheduler 222 provides fine scheduling information over dedicated beams.

Similarly, UE 202 comprises a multi-stage controller 240, which further comprises a beamforming and monitor 241, a stage-1 decoder 242, a stage-2 decoder 243, and a power control circuit 244. Beamforming and monitor 241 may belong to part of the RF chain, which applies various beamforming weights to multiple antenna elements of antenna 231 and thereby forming various beams. Beamforming is optional for UE side, because UE 202 can use omni beam instead. Beamforming and monitor 241 also monitors received radio signals and performs measurements of the radio signals over the various beams. Stage-1 decoder 243 decodes control and scheduling information over control beams. Stage-2 decoder 244 decodes control and scheduling information over dedicated beams.

Figure 3:
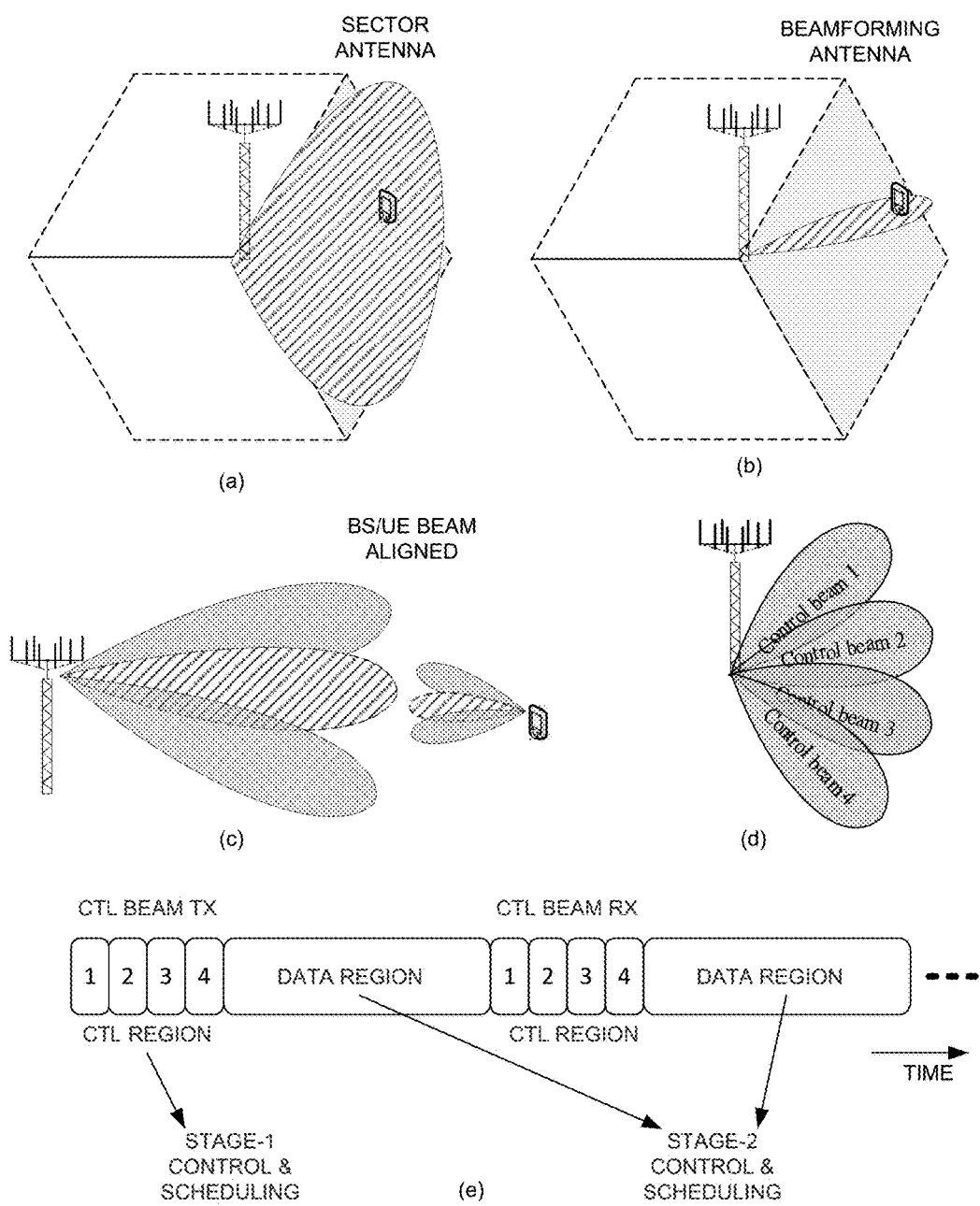
FIG. 3 illustrates multi-stage control principles utilizing control beam transmission and dedicated beam transmission in a beamforming system.

FIG. 3 illustrates multi-stage control principles utilizing control beam transmission and dedicated beam transmission in a beamforming system. Different beamformers can have different spatial resolution, i.e., beamwidth. For example, a sector antenna depicted in (a) can have smaller array gain but wider spatial coverage, while a beamforming antenna depicted in (b) can have higher array gain but narrower spatial coverage. In principle, beam-training mechanism ensures that BS beam and UE beam are aligned for data communication as depicted in (c). Beam training includes initial beam alignment and subsequent beam tracking. At a base station (BS) side, a sector/cell is served by a manageable number of coarse control beams, e.g., control beam 1 to control beam 4 as depicted by (d). Other finer-resolution BS beams are termed dedicated beams that need to be trained before usage. All control beams in a cell is referred to as control region and all dedicated beams in a cell is referred to as data region as depicted by (e). Note that the concept of control beam is a combination of beam resolution and resources. The same coarse beam can be used in the data region as well, but in such case, it is called data beam instead of control beam.

As illustrated by FIG. 3(e), the set of control beams may be periodically configured or occur indefinitely and repeatedly in order known to the UEs. Different control beams (including TX and RX) are associated with a set of allocated resource blocks, which are time division multiplexed (TDM) in time domain. Similarly, different dedicated beams are associated with a set of dedicated resource blocks for data transmission. A multi-stage scheduling scheme can be applied based on such control beam and dedicated data beam architecture. For example, during the control region, stage-1 coarse scheduling information is granted via control beam transmission. During the data region, stage-2 fine scheduling information is granted via dedicated beam transmission.

The multi-stage control scheme can also be configured for other purposes in the beamforming system. One example is for timing advance (TA), wherein control beam TA is given in absolute value via control beam while dedicated beam TA is a combination of the control beam TA value and a differential TA value (relative to control beam TA) carried in the dedicated data beam. Another example is for power control, where UE UL TX power with respect to control beam is signaled in DL control beam while UE UL TX power with respect to dedicated data beam is a combination of the control beam UL TX power and a differential TX power value (relative to the control beam UL power) carried in the dedicated data beam.

Figure 4:
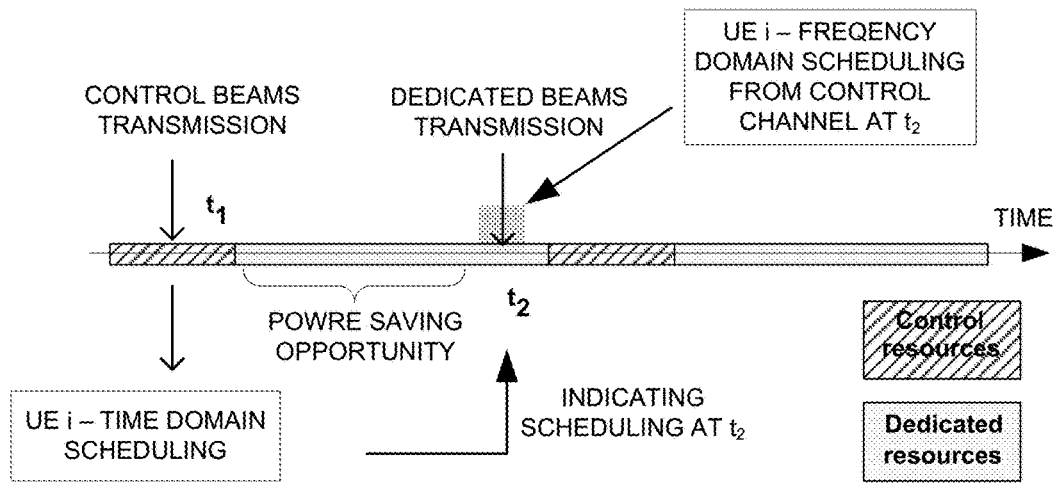
FIG. 4 illustrates a first embodiment of incremental scheduling.

FIG. 4 illustrates a first embodiment of incremental scheduling with fine-planned time scheduling. In the first embodiment, stage-1 scheduling comprises time-domain plans. The base station transmits time-domain plans for all users served by individual control beams. The time-domain plans carry time-domain scheduling information for individual users. The scheduling could be multiple time slots or a time span, an aggregated plan for a group of UEs served by a control beam, or dedicated plans for respective UEs. In the example of FIG. 4, control beam transmission occurs at time t1 during control region. UEi receives and decodes the time-domain scheduling from a first control channel at time t1. The time-domain scheduling indicates that a stage-2 frequency-domain scheduling for UEi may occur at time t2. Next, dedicated beam transmission occurs at time t2 during dedicated region. UEi receives and decodes the frequency-domain scheduling from a second control channel at time t2. Note that time-domain plan is subject to changes. The planned schedule may not happen, e.g., in the indicated time slots (time t2) for scheduled user (UEi), stage-2 scheduling may not be given.

Figure 5:
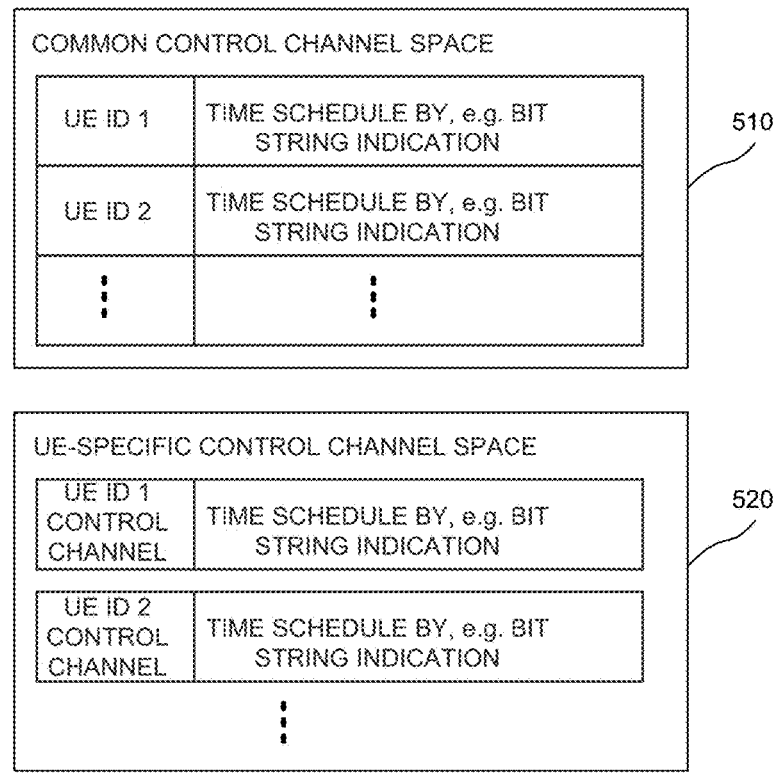
FIG. 5 illustrates stage-1 coarse scheduling of time-domain plan and corresponding control channels of the first embodiment.

FIG. 5 illustrates stage-1 coarse scheduling plan of time-domain plan and corresponding control channels of the first embodiment. Table 510 depicts time scheduling plan given via common control channel. The common control channel is designed for all served UEs and occupies a common search space. Each UE searches the common control channel space and decodes its time schedule (e.g., by bit string indication). Table 520 depicts time scheduling plan given via UE-specific control channel. The UE-specific control channel is designed for individual UEs and occupies UE-specific search space. Each UE searches the UE-specific control channel space (e.g., via UE ID) and decodes its time schedule (e.g., by bit string indication).

Figure 6:
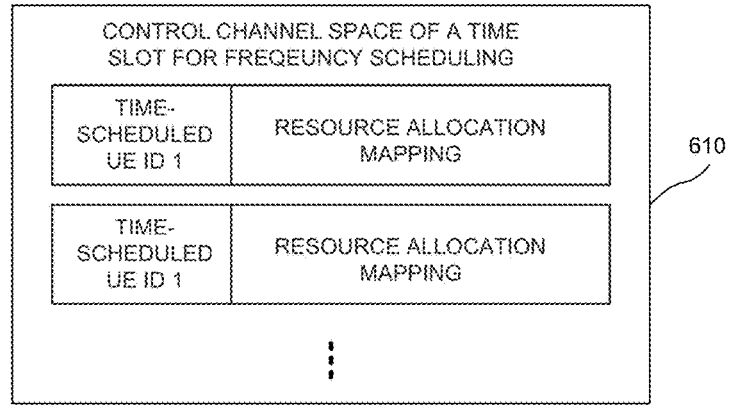
FIG. 6 illustrates stage-2 fine scheduling of frequency-domain plan and corresponding control channels of the first embodiment.

FIG. 6 illustrates stage-2 fine scheduling plan of frequency-domain plan and corresponding control channels of the first embodiment. Table 610 depicts frequency-domain plan. In time slots indicated by time-domain plan of individual users, frequency-domain plans for scheduled users are given. The frequency-domain plans tell frequency-domain scheduling for scheduled users, e.g., dedicated plans for respective UEs. Based on the frequency-domain plan, a time-scheduled user can find data transmitted for the UE. For example, a UE searches the control channel space of a time slot for frequency scheduling, and decodes the resource allocation mapping. The UE then finds the data according to the resource allocation mapping. Note that multi-user scenarios are applicable. Users scheduled in the same time slot in stage-1 may share the same frequency resource, but separated in spatial domain such as MU-MIMO. The BS needs to be equipped with multiple RF chains for MU-MIMO transmission to multiple users.

Figure 7:
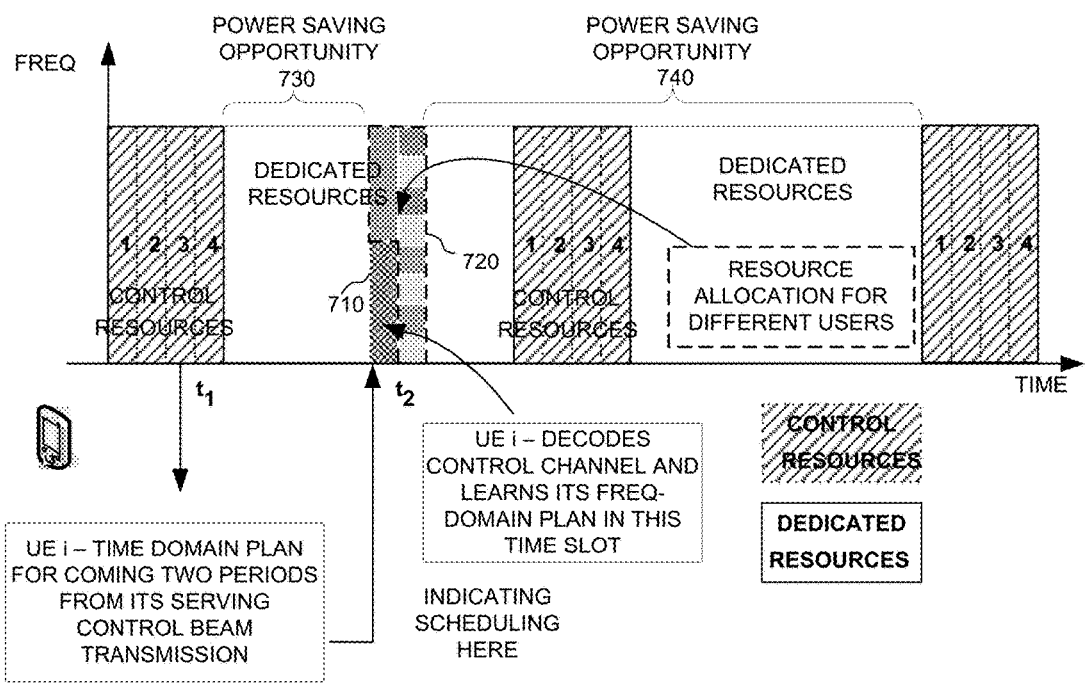
FIG. 7 illustrates an example of the first embodiment of incremental scheduling with power saving opportunity.

FIG. 7 illustrates an example of the first embodiment of incremental scheduling with power saving opportunity. In the example of FIG. 7, control beam transmission for CB1 to CB4 occurs periodically during control region. The span of stage-1 time-domain plan can be of multiple control beam periods, e.g., two control beam periods. UEi receives and decodes the stage-1 time-domain scheduling from a first control channel at time t1 via his serving control beam, e.g., CB3. The time-domain scheduling indicates that a stage-2 frequency-domain scheduling for UEi may occur later at time t2 (fine-planned time scheduling). Next, dedicated beam transmission occurs during dedicated region. UEi receives and decodes the frequency-domain scheduling from a second control channel at timeslot 710 (time t2). Different users may find their own frequency-domain plan and resource allocation at different location indicated by their own stage-1 time-domain plan, as depicted by box 720.

Because the time-domain plan is transmitted periodically via control beam transmission, it creates a natural discontinuous reception (DRX) cycle for power saving opportunity. As illustrated in FIG. 7, the span of the time-domain plan is two control beam transmission periods. As a result, UEi is able to go to power saving mode after the first control beam transmission to time t2 (duration 730), and from time t2 to the next control beam transmission (duration 740). The span/periodicity of the time-domain plan can be UE-specific. The span can be configured by higher layer signaling, indicated by a field in the time-domain plan, or implicitly indicated among different blind decoding control channel candidates.

Figure 8:
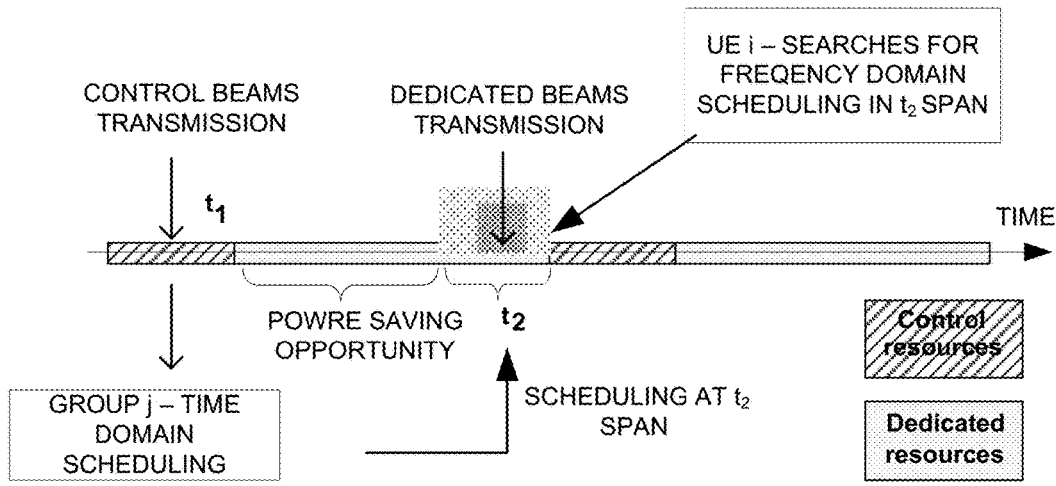
FIG. 8 illustrates a second embodiment of incremental scheduling.

FIG. 8 illustrates a second embodiment of incremental scheduling with coarse-planned time scheduling. In the second embodiment, users with individual control beams are grouped into groups. For example, the groups can be based on channel quality, random grouping, priority, spatial signature (as in SDMA or geographical direction), or mobility. In stage-1, the base station transmits time-domain plans for all users served by individual control beams. The time-domain plans carry time-domain scheduling information for individual user groups. The scheduling could be multiple time slots for a group, an aggregated plan for all group, or dedicated plans for respective individual groups.

In the example of FIG. 8, control beam transmission occurs at time t1 during control region. Groupj UEs receive and decode the time-domain scheduling from a first control channel at time t1. The time-domain scheduling indicates that a stage-2 frequency-domain scheduling for Groupj UEs may occur at time t2. Next, dedicated beam transmission occurs at time t2 during dedicated region. A Groupj UEi receives and decodes the frequency-domain scheduling from a second control channel at time t2. Note that time-domain plan is subject to changes from UE perspective. The planned scheduled may not happen for a specific user in a group.

Figure 9:
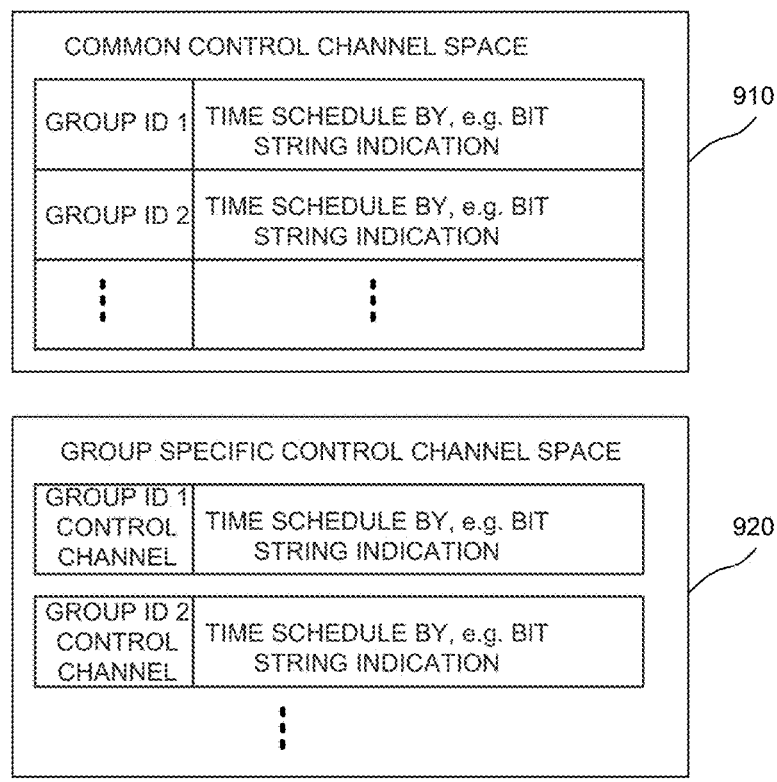
FIG. 9 illustrates stage-1 coarse scheduling of time-domain plan and corresponding control channels of the second embodiment.

FIG. 9 illustrates stage-1 coarse scheduling plan of time-domain plan and corresponding control channels of the second embodiment. Table 910 depicts time scheduling plan given via common control channel. The common control channel is designed for all served UE groups and occupies a common search space. Each UE group searches the common control channel space and decodes its time schedule (e.g., by bit string indication). Table 920 depicts time scheduling plan given via group-specific control channel. The group-specific control channel is designed for individual UE groups and occupies group-specific search space. Each UE searches the group-specific control channel space (e.g., via group-RNTI) and decodes its time schedule (e.g., by bit string indication).

Figure 10:
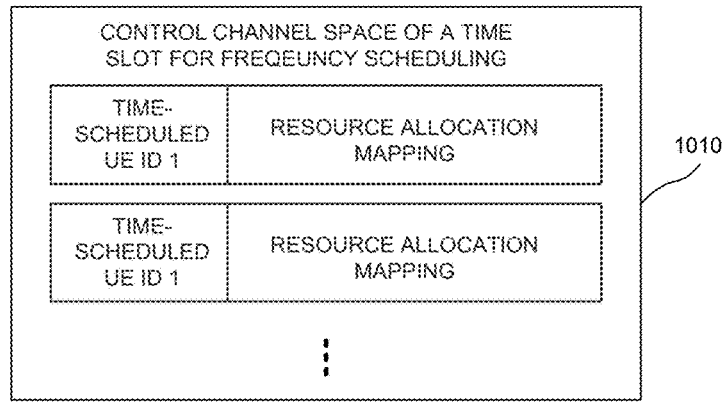
FIG. 10 illustrates stage-2 fine scheduling of frequency-domain plan and corresponding control channels of the second embodiment.

FIG. 10 illustrates stage-2 fine scheduling plan of frequency-domain plan and corresponding control channels of the second embodiment. Table 1010 depicts frequency-domain plan. In time slots indicated by time-domain plan of individual user groups, frequency-domain plans for scheduled users are given. The frequency-domain plans tell frequency-domain scheduling for scheduled users, e.g., dedicated plans for respective UEs. Based on the frequency-domain plan, a time-scheduled user can find data transmitted for the UE. For example, a UE searches the control channel space of a time slot for frequency scheduling, and decodes the resource allocation mapping. The UE then finds the data according to the resource allocation mapping. Note that multi-user scenarios are applicable. Users scheduled in the same time slot in stage-1 may share the same frequency resource, but separated in spatial domain such as MU-MIMO. The BS needs to be equipped with multiple RF chains for MU-MIMO transmission to multiple users.

Figure 11:
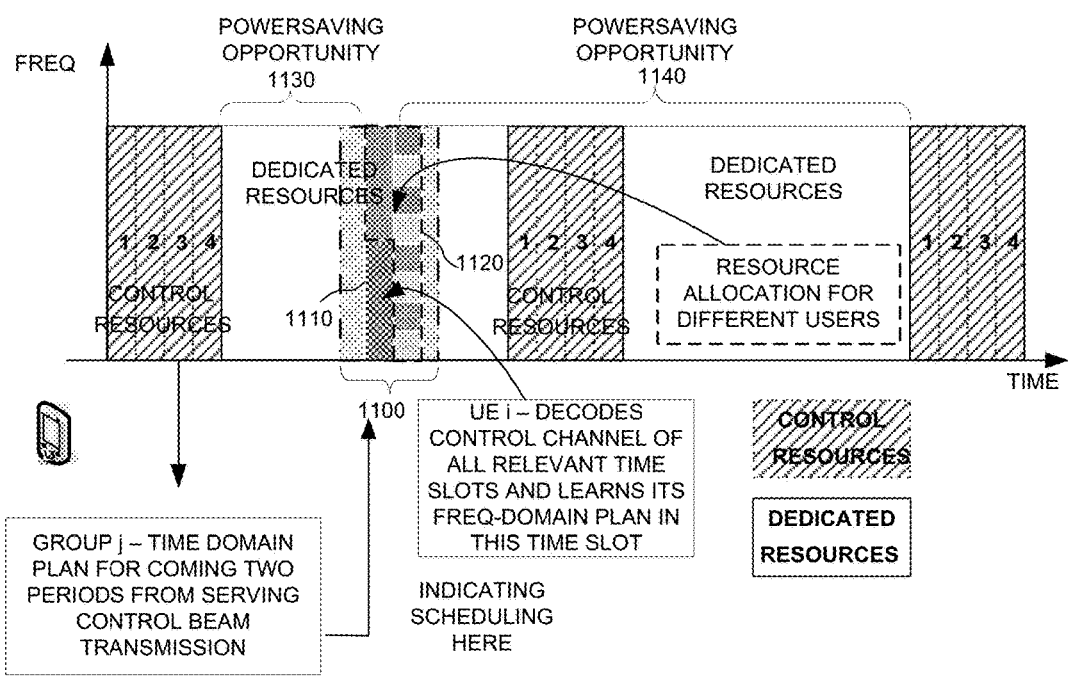
FIG. 11 illustrates an example of the second embodiment of incremental scheduling with power saving opportunity.

FIG. 11 illustrates an example of the second embodiment of incremental scheduling with power saving opportunity. In the example of FIG. 11, control beam transmission for CB1 to CB4 occurs periodically during control region. The span of stage-1 time-domain plan can be of multiple control beam periods, e.g., two control beam periods. Groupj UEs receive and decode the stage-1 time-domain scheduling from a first control channel at time t1 via their serving control beam, e.g., CB3. The time-domain scheduling indicates that a stage-2 frequency-domain scheduling for UEs may occur later during shaded area 1100 (a coarse-planned time scheduling). Next, dedicated beam transmission occurs during dedicated region. UEi receives and decodes control channel scheduling from all time slots in shaded area 1100 and learns its own frequency-domain plan in time slot 1110. Different users in the same group may find their own frequency-domain plan and resource allocation at different location within the shaded area 1100 as indicated by the own stage-1 time-domain plan, as depicted by box 1120.

Because the time-domain plan is transmitted periodically via control beam transmission, it creates a natural DRX cycle for power saving opportunity. As illustrated in FIG. 11, the span of the time-domain plan is two control beam transmission periods. As a result, UEi is able to go to power saving mode after the first control beam transmission to timeslot 1110 (duration 1130), and from timeslot 1110 to the next control beam transmission (duration 1140). The span/periodicity of the time-domain plan can be group-specific. The span can be configured by higher layer signaling, indicated by a field in the time-domain plan, or implicitly indicated among different blind decoding control channel candidates.

The above illustrated incremental two-stage control signaling method can be extended. In general, the stage-1 coarse scheduling plan is given via control beam transmission, and comprises coarse scheduling information including exact or rough time-domain information only, or both time-domain and frequency-domain information. For example, it can include rough time-domain info plus rough frequency-domain info, or it can include exact time-domain info plus rough frequency-domain info. The stage-2 fine scheduling plan is given via dedicated beam transmission, and comprises fine scheduling information including complementary/exact frequency-domain info, or complementary/exact time-domain info plus complementary frequency-domain info. Incremental 2-stage scheduling can also be degenerated to one-stage method where both stage-1 and stage-2 plan are given in control beam transmissions. Further, stage-1 plan is subject to changes. At resources indicated by stage-1 plan, a user may find no resource allocation. It is up to BS decision based on real-time traffic. If this happens, the resources could be allocated to other users that were also indicated for scheduling in the stage-1 plan.

Figure 12:
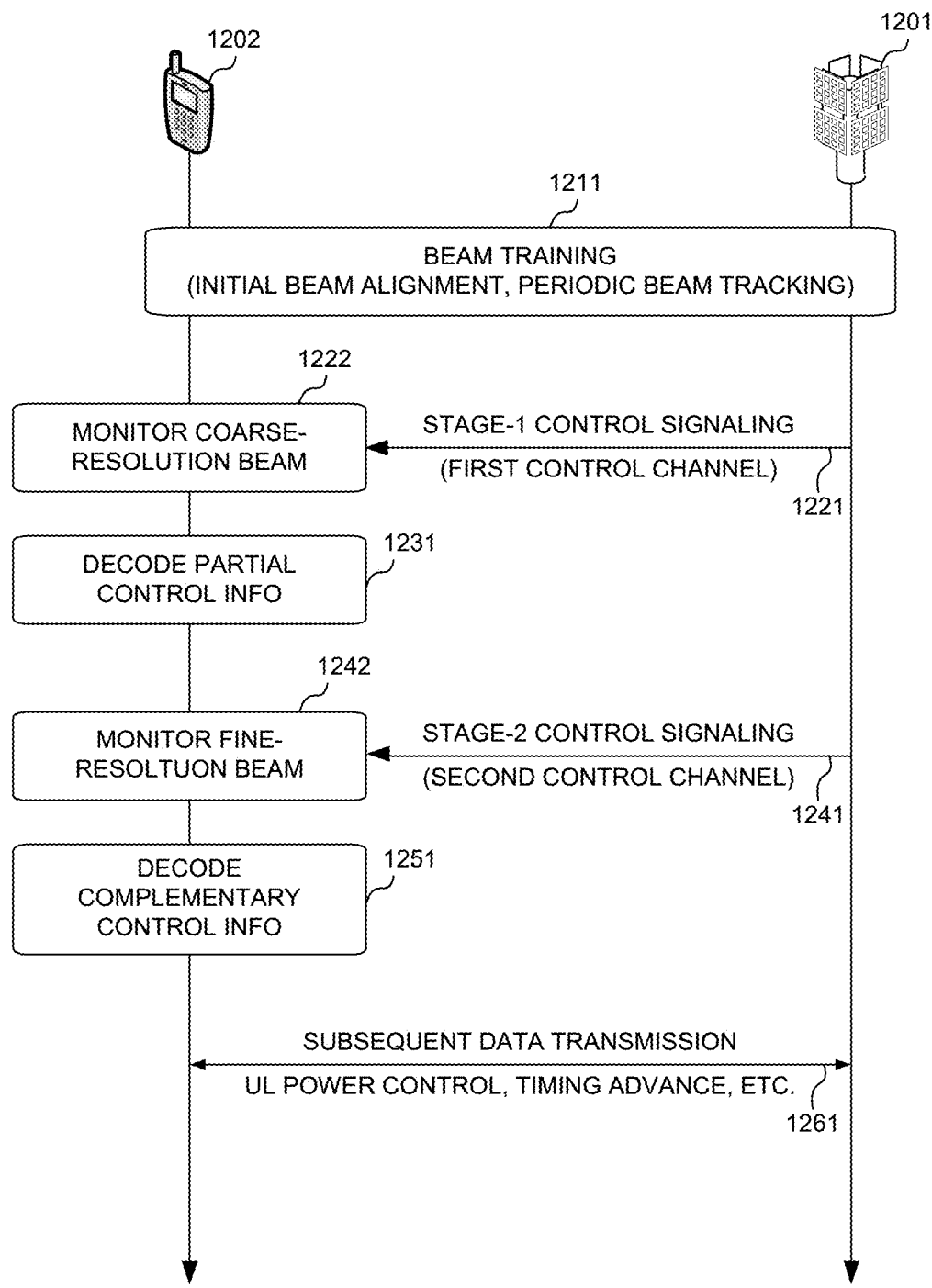
FIG. 12 illustrates a procedure of an embodiment of incremental scheduling.

FIG. 12 illustrates a procedure of an embodiment of incremental scheduling in a beamforming system. In step 1211, a serving base station 1201 performs beam-training procedure with UE 1202, which includes both initial beam alignment and subsequent beam tracking. After beam training, BS 1201 and UE 1202 are able to communicate via two levels of beams, a first level of coarse-resolution beams (e.g., control beams) and a second level of fine-resolution beams (e.g., dedicated beams). In step 1221, BS 1201 signals partial control information via a first control channel to UE 1202. The first control channel is transmitted by a coarse-resolution beam. In step 1231, UE 1202 receives and decodes the partial information. The partial information could be a complete information that is applicable for transmissions related to the coarse-resolution beam. In step 1241, BS 1201 signals complementary control information (e.g., remaining information) via a second control channel to UE 1202. The second control channel is transmitted by a fine-resolution beam. In step 1251, UE 1202 receives and decodes the complementary information. The combination of the partial and the complementary information provides complete information that is applicable for transmission related to the fine-resolution beam. In step 1261, UE 1202 is able to receive UE data and perform corresponding actions based on the complete control information. In one example, steps 1241 and 1261 happen at the same time. UE 1202 decodes the second control channel and finds UE data (if scheduled) in the same subframe.

Figure 13:
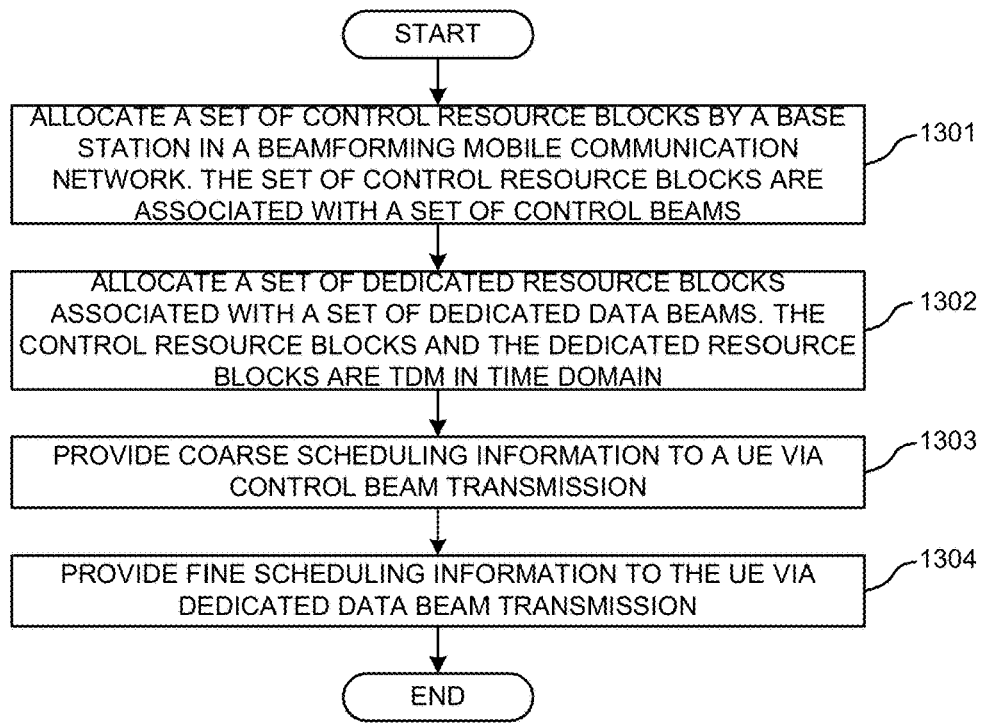
FIG. 13 is a flow chart of a method of incremental scheduling from BS perspective in a beamforming system in accordance with one novel aspect.

FIG. 13 is a flow chart of a method of incremental scheduling from BS perspective in a beamforming system in accordance with one novel aspect. In step 1301, a base station allocates a set of control resource blocks in a beamforming mobile communication network. The set of control resource blocks are associated with a set of control beams. In step 1302, the base station allocates a set of dedicated resource blocks associated with a set of dedicated data beams. The control resource blocks and the dedicated resource blocks are time division multiplexed in time domain. In step 1303, the base station provides coarse scheduling information to a UE via control beam transmission. In step 1304, the base station provides fine scheduling information to the UE via dedicated data beam transmission.

Figure 14:
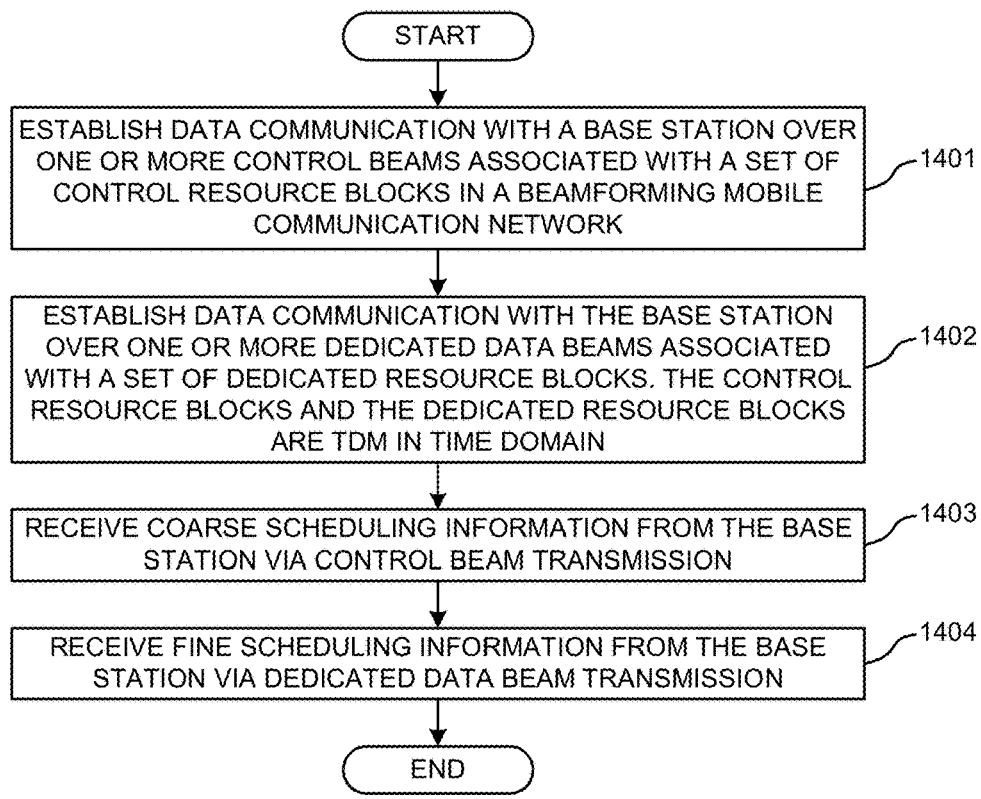
FIG. 14 is a flow chart of a method of incremental scheduling from UE perspective in a beamforming system in accordance with one novel aspect.

FIG. 14 is a flow chart of a method of incremental scheduling from UE perspective in a beamforming system in accordance with one novel aspect. In step 1401, a UE establishes data communication with a base station over one or more control beams associated with a set of control resource blocks in a beamforming mobile communication network. In step 1402, the UE establishes data communication with the base station over one or more dedicated data beams associated with a set of dedicated resource blocks. The control resource blocks and the dedicated resource blocks are time division multiplexed in time domain. In step 1403, the UE receives coarse scheduling information from the base station via control beam transmission. In step 1404, the UE receives fine scheduling information from the base station via dedicated data beam transmission.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) allocating a first set of resource blocks by a base station in a Millimeter Wave (mmWave) beamforming mobile communication network, wherein the first set of resource blocks is associated with a first mmWave spatial beam;
   (b) allocating a second set of resource blocks associated with a second mmWave spatial beam, wherein the first set of resource blocks and the second set of resource blocks are time division multiplexed (TDM) in time domain, and wherein the first and the second mmWave spatial beams are individually indicated by the base station;
   (c) providing coarse scheduling information to a user equipment (UE) via the first mmWave spatial beam transmission, wherein the coarse scheduling information comprises a time-domain scheduling plan for the UE; and
   (d) providing fine scheduling information to the UE via the second mmWave spatial beam transmission, wherein the coarse scheduling and the fine scheduling information are provided by the same base station to the same UE in the same beamforming network.

2. The method of claim 1, wherein the second mmWave spatial beam is associated with periodical resources indicated by the coarse scheduling information.

3. The method of claim 1, wherein the coarse scheduling information is UE-specific or group-specific.

4. The method of claim 1, wherein the coarse scheduling information comprises the time-domain scheduling plan indicating time slots for the UE to monitor for the fine scheduling information.

5. The method of claim 1, wherein the fine scheduling information comprises a frequency-domain scheduling plan indicating scheduled resources for the UE.

6. The method of claim 1, wherein the fine scheduling information comprises the same frequency-domain scheduling plan for multiple UEs.

7. The method of claim 1, wherein the time-domain scheduling plan has a periodicity that is a multiple number of a spatial beam period for UE power saving opportunity.

8. A method, comprising:
   (a) establishing data communication by a user equipment (UE) with a base station over a first Millimeter Wave (mmWave) spatial beam associated with a first set of resource blocks in a mmWave beamforming mobile communication network;
   (b) establishing data communication by the UE with the base station over a second mmWave spatial beam associated with a second set of resource blocks, wherein the first set of resource blocks and the second set of resource blocks are time division multiplexed (TDM) in time domain, and wherein the first and the second mmWave spatial beams are individually indicated from the base station;
   (c) receiving coarse scheduling information from the base station via the first mmWave spatial beam transmission, wherein the coarse scheduling information comprises a time-domain scheduling plan for the UE; and
   (d) receiving fine scheduling information from the base station via the second mmWave spatial beam transmission, wherein the coarse scheduling and the fine scheduling information are provided by the same base station to the same UE in the same beamforming network.

9. The method of claim 8, wherein the coarse scheduling information is UE-specific or group-specific.

10. The method of claim 8, wherein the coarse scheduling information comprises the time-domain scheduling plan indicating time slots for the UE to monitor for the fine scheduling information.

11. The method of claim 10, wherein the UE goes to power saving mode during time slots that are not indicated by the coarse scheduling plan.

12. The method of claim 8, wherein the fine scheduling information comprises a frequency-domain scheduling plan indicating scheduled resources for the UE.

13. A user equipment (UE), comprising:
   a radio frequency (RF) transceiver that establishing data communication with a base station over a first Millimeter Wave (mmWave) spatial beams associated with a first set of resource blocks in a mmWave beamforming mobile communication network, the RF transceiver also establishes data communication with the base station over a second mmWave spatial beam associated with a second set of resource blocks, wherein the first set of resource blocks and the second set of resource blocks are time division multiplexed (TDM) in time domain, and wherein the first and the second mmWave spatial beams are individually indicated from the base station; and a decoder that decodes coarse scheduling information from the base station via the first mmWave spatial beam transmission, the decoder also decodes fine scheduling information from the base station via the second mmWave spatial beam transmission, wherein the coarse scheduling information comprises a time-domain scheduling plan for the UE, and wherein the coarse scheduling and the fine scheduling information are provided by the same base station to the same UE in the same beamforming network.

14. The UE of claim 13, wherein the coarse scheduling information is UE-specific or group-specific.

15. The UE of claim 13, wherein the coarse scheduling information comprises the time-domain scheduling plan indicating time slots for the UE to monitor for the fine scheduling information.

16. The UE of claim 15, wherein the UE goes to power saving mode during time slots that are not indicated by the coarse scheduling plan.

17. The UE of claim 13, wherein the fine scheduling information comprises a frequency-domain scheduling plan indicating scheduled resources for the UE.

* * * * *